H. E. OLIVER.
SAFETY WAGON NUT.
APPLICATION FILED JULY 5, 1910.
993,865.
Patented May 30, 1911.
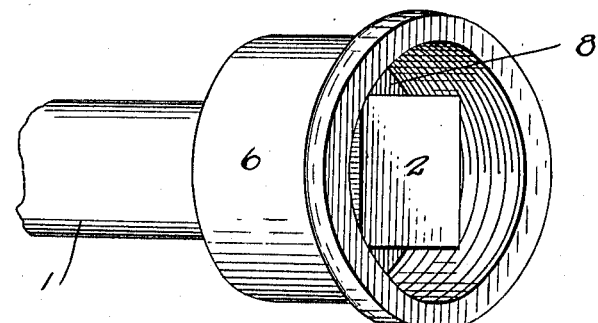
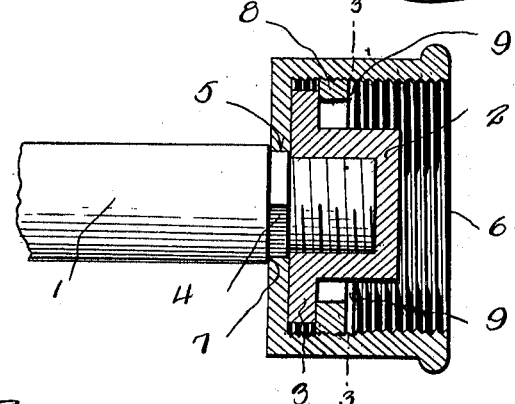
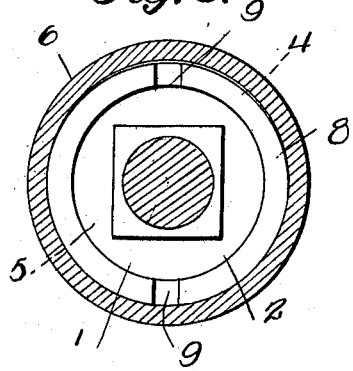
Witnesses
C. C. Richardson
Inventor
Herman E. Oliver
By Victor J. Evans
Attorney

UNITED STATES PATENT OFFICE.

HERMAN E. OLIVER, OF HUNTINGTON, WEST VIRGINIA, ASSIGNOR OF ONE-HALF TO F. W. JONES, OF HUNTINGTON, WEST VIRGINIA.

SAFETY WAGON-NUT.

993,865.     Specification of Letters Patent.     Patented May 30, 1911.

Application filed July 5, 1910. Serial No. 570,370.

*To all whom it may concern:*

Be it known that I, HERMAN E. OLIVER, a citizen of the United States, residing at Huntington, in the county of Cabell and State of West Virginia, have invented new and useful Improvements in Safety Wagon-Nuts, of which the following is a specification.

This invention relates to nut locks and particularly to that type which is adapted for use upon axle stubs.

The object of the invention is the provision of means which will rigidly hold the nut to the stub, so that it is impossible to move with relation thereto, and further means for concealing the nut so that it cannot be engaged to accidentally turn the nut upon the axle stub.

Further objects of the invention will appear as the following specific description is read in connection with the accompanying drawing, which forms a part of this application, and in which:—

Figure 1 is a perspective view of an axle stub, showing the nut locking device applied; Fig. 2 is a longitudinal section therethrough; Fig. 3 is a transverse section taken on the line 3—3 of Fig. 2. Fig. 4 is a detail longitudinal section showing the device applied to the dust cap.

Referring more particularly to the drawing, 1 represents an axle stub which is threaded upon its outer end to receive the usual blind nut 2 having an inner annular flange 3. Between the circular and threaded portions of the axle 1, the stub is squared, as at 4, to enter a squared opening 5 in the bottom of a cup-like washer 6 which is internally threaded, as shown. This washer is held in place upon the squared portion of the stub by means of the nut which, when threaded onto the axle, has its annular flange 3 engaging the bottom and holding the same against the shoulder 7 formed on the axle. The nut 2 is prevented from movement by an externally threaded nut 8 which surrounds the nut and seats upon the top of the annular flange 3. This nut 8 is provided with a pair of diametrically opposite notches 9, whereby a spanner may be applied thereto to thread the same into the washer 6. If desired, a dust cap may be threaded into the washer, as shown, so as to abut against the nut 8 and thereby doubly insure the disengagement of the nut.

In assembling the device the hub is first placed upon the axle and then the washer is slipped over the threaded end into engagement with the shoulder 7 and the squared portion 4. The nut is then threaded upon the end of the axle and the ring subsequently threaded into the washer so as to seat upon the annular flange of the nut. The dust cap is then placed in position as shown to conceal the nut and ring to prevent the latter from becoming disengaged with the nut.

Having thus described the invention, what I claim is:—

In combination, an axle having a squared portion and a threaded end, a cup-like washer having a squared opening to engage the squared portion and being internally threaded, a nut mounted upon the threaded end of the axle and seated in the cup, said nut having an annular flange to hold the washer upon the squared portion of the axle, a nut threaded in the washer and surrounding the first-mentioned nut, said last nut adapted to engage the annular flange of the first nut to prevent the disengagement of said first nut from the axle, and means to conceal the first and second nuts, said means preventing the disengagement of the second nut.

In testimony whereof I affix my signature in presence of two witnesses.

HERMAN E. OLIVER.

Witnesses:
   GRANT SIMPSON,
   JOHN E. CALLICOAT.

---

Copies of this patent may be obtained for five cents each, by addressing the "Commissioner of Patents, Washington, D. C."